United States Patent
Wu

(10) Patent No.: US 10,514,736 B2
(45) Date of Patent: Dec. 24, 2019

(54) METHOD AND COMPUTER SYSTEM FOR REDUCING NOISE FROM COOLING FAN

(71) Applicant: GETAC TECHNOLOGY CORPORATION, Hsinchu County (TW)

(72) Inventor: Chi-Jung Wu, Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 50 days.

(21) Appl. No.: 15/914,970

(22) Filed: Mar. 7, 2018

(65) Prior Publication Data

US 2019/0121409 A1     Apr. 25, 2019

(30) Foreign Application Priority Data

Oct. 20, 2017   (CN) .......................... 2017 1 0982574

(51) Int. Cl.
```
G06F 1/20      (2006.01)
G06F 1/324     (2019.01)
G06F 21/35     (2013.01)
F04D 27/00     (2006.01)
```
(52) U.S. Cl.
CPC .............. G06F 1/206 (2013.01); G06F 1/324 (2013.01); G06F 21/35 (2013.01); F04D 27/004 (2013.01); G06F 2221/2139 (2013.01); G06F 2221/2153 (2013.01)

(58) Field of Classification Search
None
See application file for complete search history.

(56) References Cited

U.S. PATENT DOCUMENTS

| | | | | |
|---|---|---|---|---|
| 6,243,656 | B1* | 6/2001 | Arai | G06F 1/206 702/132 |
| 6,496,346 | B1* | 12/2002 | Bruckner | G06F 1/206 307/117 |
| 7,228,508 | B1* | 6/2007 | Pippin | G06F 1/206 716/136 |
| 2005/0071705 | A1* | 3/2005 | Bruno | G06F 1/206 713/500 |
| 2006/0034343 | A1* | 2/2006 | Rotem | G06F 1/206 374/45 |

(Continued)

*Primary Examiner* — Bernard G Lindsay

(57) ABSTRACT

A method and a computer system for reducing noise are provided. The method includes: setting the computer system's operating mode to normal mode or low-noise mode by a processing unit according to a selection signal; measuring an operating temperature of the processing unit; controlling a rotational speed of a fan unit conducive to dissipation of heat from the processing unit according to the operating temperature by a fan-control unit in normal mode; detecting the operating temperature according to a first threshold and starting an overheat-protection mechanism by the processing unit in normal mode when the operating temperature reaches the first threshold; shutting down the fan unit by the fan-control unit in low-noise mode; and detecting the operating temperature according to a second threshold lower than the first threshold and starting the overheat-protection mechanism by the processing unit in low-noise mode when the operating temperature reaches the second threshold.

8 Claims, 2 Drawing Sheets

(56) References Cited

U.S. PATENT DOCUMENTS

| | | | |
|---|---|---|---|
| 2007/0027580 A1* | 2/2007 | Ligtenberg | G05D 23/19 |
| | | | 700/300 |
| 2010/0030395 A1* | 2/2010 | Shimotono | G06F 1/206 |
| | | | 700/300 |
| 2016/0231863 A1* | 8/2016 | Huang | G06F 3/0412 |

* cited by examiner

METHOD AND COMPUTER SYSTEM FOR REDUCING NOISE FROM COOLING FAN

CROSS REFERENCE TO RELATED APPLICATIONS

This Application claims priority of China Patent Application No. 201710982574.7 filed on Oct. 20, 2017, the entirety of which is incorporated by reference herein.

BACKGROUND OF THE INVENTION

Field of the Invention

The present invention relates to computer systems and, more particularly, to a computer system for reducing noise from a cooling fan.

Description of the Prior Art

Owing to technological advancement, electronic products have increasingly high performance. Electronic components inside a high-performance electronic product operate and generate heat. If the heat is not instantly removed from the electronic product, the electronic product will be likely to overheat and hang. In case of excessive heat buildup, the electronic product may burn, leading to its destruction. Therefore, most electronic products have a built-in cooling fan whereby the electronic products operate within a certain range of temperatures.

However, cooling fans in operation produce noise, and the noise thus produced increases with the rotational speed of the cooling fans. Loud noise makes people nervous, anxious and fatigued, decreases people's efficiency at work, and even harms people psychologically and physiologically. Furthermore, when it comes to portable electronic products, cooling fans in operation consume battery power otherwise available to the portable electronic products; as a result, the portable electronic products' operable duration or standby duration shortens, ending up with shortened battery life.

SUMMARY OF THE INVENTION

In view of the aforesaid drawbacks of the prior art, the present invention provides a computer system and method for reducing noise from a cooling fan.

In an embodiment, a computer system for reducing noise from a cooling fan comprises a processing unit, a temperature detecting unit, a fan unit and a fan control unit. The processing unit sets an operating mode of the computer system to a normal mode or a low noise mode according to a selection signal. The processing unit has an operating temperature. The temperature detecting unit measures the operating temperature of the processing unit. The fan unit is conducive to dissipation of heat from the processing unit. The fan control unit is coupled to the fan unit and the processing unit. The fan control unit is controlled by the processing unit. In the normal mode, the fan control unit adjusts a rotational speed of the fan unit according to the operating temperature, and the processing unit starts an overheat protection mechanism when the operating temperature reaches a first threshold. In the low noise mode, the fan control unit shuts down the fan unit, and the processing unit starts an overheat protection mechanism when the operating temperature reaches a second threshold. The second threshold is lower than the first threshold.

In an embodiment, a method for reducing noise from a cooling fan comprises the steps of: setting an operating mode of a computer system to a normal mode or a low noise mode by a processing unit according to a selection signal; measuring an operating temperature of the processing unit; controlling a rotational speed of a fan unit conducive to dissipation of heat from the processing unit according to the operating temperature by a fan control unit in the normal mode; detecting the operating temperature according to a first threshold and starting an overheat protection mechanism by the processing unit in the normal mode when the operating temperature reaches the first threshold; shutting down the fan unit by the fan control unit in the low noise mode; and detecting the operating temperature according to a second threshold and starting the overheat protection mechanism by the processing unit in the low noise mode when the operating temperature reaches the second threshold, wherein the second threshold is lower than the first threshold.

In conclusion, a computer system and method for reducing noise from a cooling fan according to the present invention feature a low noise mode in which a fan unit is shut down to not only reduce noise therefrom and thus silence the computer system in operation, but also reduce power consumed by the fan unit in operation and thus increase the computer system's operable duration or standby duration, thereby extending its battery life.

DETAILED DESCRIPTION OF THE EMBODIMENTS

Figure 1:
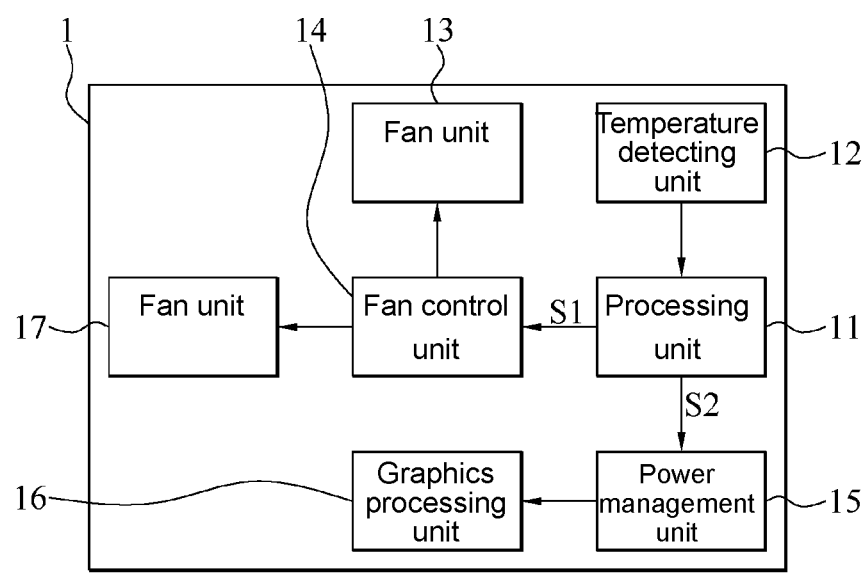
FIG. 1 is a block diagram of a computer system for reducing noise from a cooling fan according to an embodiment of the present invention.

FIG. 1 is a block diagram of a computer system 1 for reducing noise from a cooling fan according to an embodiment of the present invention. Referring to FIG. 1, the computer system 1 for reducing noise from a cooling fan comprises a processing unit 11, a temperature detecting unit 12, a fan unit 13 and a fan control unit 14. The processing unit 11 is coupled between the temperature detecting unit 12 and the fan control unit 14. The fan control unit 14 is coupled to the fan unit 13.

The processing unit 11 starts to operate as soon as the computer system 1 is powered on. The processing unit 11 has an operating temperature. The temperature detecting unit 12 measures the operating temperature of the processing unit 11. The temperature detecting unit 12 sends the operating temperature of the processing unit 11 to the processing unit 11. The processing unit 11 controls the fan control unit 14 according to the operating temperature such that the fan control unit 14 controls the fan unit 13 to operate or stop operating. If the fan control unit 14 controls the fan unit 13 to operate, the fan unit 13 will assist the processing unit 11 in dissipating heat such that the operating temperature of the processing unit 11 drops, thereby precluding overly high temperature inside the computer system 1. If the fan control unit 14 controls the fan unit 13 to stop operating, it will reduce noise from the computer system 1.

The processing unit 11 has different operating modes. Specifically speaking, the processing unit 11 has at least two operating modes. The operating modes comprise the normal mode and the low noise mode. The processing unit 11 sets the operating mode of the computer system 1 to the normal mode or the low noise mode according to a selection signal;

hence, users can operate the computer system 1 in the normal mode or the low noise mode. For instance, when the computer system 1 is a notebook computer, the users can browse the Web, edit documents, as well as play videos and music in the normal mode or the low noise mode.

Figure 2:
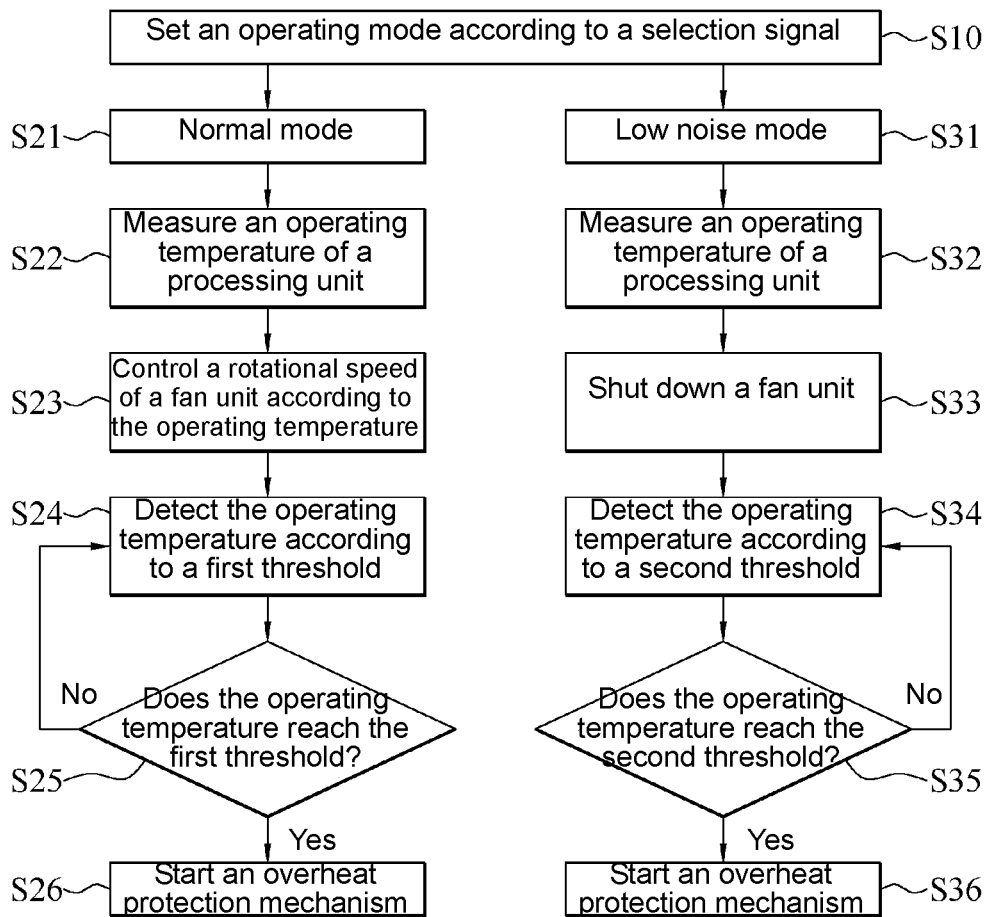
FIG. 2 is a flowchart of a method for reducing noise from a cooling fan according to an embodiment of the present invention.

FIG. 2 is a flowchart of a method for reducing noise from a cooling fan according to an embodiment of the present invention. Referring to FIG. 1 and FIG. 2, when the computer system 1 is operating, the processing unit 11 sets the operating mode of the computer system 1 according to a selection signal (step S10). When the selection signal indicates the normal mode, the processing unit 11 will set the operating mode of the computer system 1 to the normal mode (step S21). When the selection signal indicates the low noise mode, the processing unit 11 will set the operating mode of the computer system 1 to the low noise mode (step S31). In the normal mode, the temperature detecting unit 12 measures the operating temperature of the processing unit 11 (step S22). Afterward, the processing unit 11 controls the fan control unit 14 according to the operating temperature of the processing unit 11 such that the fan control unit 14 controls a rotational speed of the fan unit 13 according to the operating temperature of the processing unit 11 (step S23), thereby adjusting the rotational speed of the fan unit 13. When the operating temperature of the processing unit 11 is high, the processing unit 11 drives the fan control unit 14 to order the fan unit 13 to function at a high rotational speed. When the operating temperature of the processing unit 11 is low, the processing unit 11 drives the fan control unit 14 to order the fan unit 13 to function at a low rotational speed. In an embodiment, the processing unit 11 generates a control signal S1 with a corresponding logic level according to whether the operating temperature is high or low, and in consequence the fan control unit 14 controls the fan unit 13 to function at a corresponding rotational speed according to the control signal S1. For instance, if the operating temperature of the processing unit 11 is higher than 60° C., the processing unit 11 will drive the fan control unit 14 to control the fan unit 13 to function at a high rotational speed, say, 5000 revolutions per minute. If the operating temperature of the processing unit 11 is lower than 50° C., the processing unit 11 will drive the fan control unit 14 to control the fan unit 13 to function at a low rotational speed, say, 4000 revolutions per minute.

In the normal mode, the processing unit 11 further detects the operating temperature thereof according to a first threshold (step S24), and then the processing unit 11 determines whether the operating temperature reaches the first threshold (step S25). If the processing unit 11 determines that the operating temperature thereof reaches the first threshold (i.e., the result of determination is "Yes"), the processing unit 11 will start an overheat protection mechanism (step S26) whereby the operating temperature of the processing unit 11 drops. If the processing unit 11 determines that the operating temperature thereof does not reach the first threshold (i.e., the result of determination is "No"), the processing unit 11 will not start the overheat protection mechanism, such that the processing unit 11 will go back to step S24 to monitor and determine in steps S24, S25 whether the operating temperature thereof reaches the first threshold and whether to start the overheat protection mechanism. In an embodiment, in step S25, the processing unit 11 compares the operating temperature thereof with the first threshold. If the operating temperature is equal to or higher than the first threshold, the processing unit 11 will determine that the operating temperature reaches the first threshold. If the operating temperature is lower than the first threshold, the processing unit 11 will determine that the operating temperature does not reach the first threshold.

In the low noise mode, the processing unit 11 controls the fan control unit 14 to shut down the fan unit 13 (step S33). In other words, the processing unit 11 drives the fan control unit 14 to control the fan unit 13 to stop operating such that the rotational speed of the fan unit 13 becomes zero, thereby reducing noise from the fan unit 13. To prevent the computer system 1 from overheating, the temperature detecting unit 12 measures the operating temperature of the processing unit 11 in the low noise mode (step S32), and then the processing unit 11 detects the operating temperature thereof according to a second threshold (step S34). The second threshold is lower than the first threshold. If the processing unit 11 determines that the operating temperature thereof reaches the second threshold (i.e., the result of determination is "Yes"), the processing unit 11 will start the overheat protection mechanism (step S36). Therefore, in the low noise mode, the processing unit 11 starts the overheat protection mechanism as soon as the operating temperature reaches the second threshold such that the computer system 1 will not overheat as a result of the shutdown of the fan unit 13. Hence, unlike the normal mode, the low noise mode enables the fan unit 13 to stop operating, and thus noise generated from the computer system 1 diminishes. Take conventional cooling fans in wide use as an example, the present invention reduces noise from them by 10 dB to 20 dB. Moreover, the fan unit 13 which is not functioning reduces power consumption of the computer system 1 by 1 W to 5 W, depending on the specifications of the cooling fans.

In an embodiment, the processing unit 11 has a mode selection pin for receiving the selection signal. The processing unit 11 sets the operating mode thereof according to the selection signal to therefore operate in the low noise mode or the normal mode. To meet their needs, the users of the computer system 1 operate the computer system 1, select the operating mode of the processing unit 11, and allow the processing unit 11 to receive the selection signal accordingly. For instance, if the users need quiet surroundings, the users will control the processing unit 11 to operate in the low noise mode. In an embodiment, the processing unit 11 receives a selection signal with a first logic level when the users select the normal mode, and the processing unit 11 receives a selection signal with a second logic level when the users select the low noise mode. If the selection signals are digital signals, the first logic level and the second logic level are logic 0 and logic 1, respectively.

In an embodiment, the computer system 1 further comprises a storage unit. A designer of the computer system 1 predefines the first threshold and the second threshold and then stores the predefined first and second thresholds in the storage unit of the computer system 1. The processing unit 11 in operation retrieves the first threshold and the second threshold from the storage unit and then compares in the normal mode the operating temperature of the processing unit 11 with the first threshold or compares in the low noise mode the operating temperature of the processing unit 11 with the second threshold. The computer system 1 further comprises a display unit. The computer system 1 provides a basic input/output system (BIOS) configuration interface. The BIOS configuration interface provides configuration options for the normal mode and the low noise mode. The processing unit 11 executes BIOS code whereby the BIOS configuration interface is displayed on the display unit of the computer system 1. When the users configure the operating mode of the processing unit 11 with the BIOS configuration interface, the processing unit 11 receives the selection signal and sets the operating mode of the processing unit 11 to the normal mode or the low noise mode.

In an embodiment, the first threshold and the second threshold each comprise an underclocking temperature, a hibernation temperature and a shutdown temperature. The processing unit 11 starts an underclocking mechanism of the overheat protection mechanism according to the underclocking temperature, starts a hibernation mechanism of the overheat protection mechanism according to the hibernation temperature, and starts a shutdown mechanism of the overheat protection mechanism according to the shutdown temperature. Given one of the first threshold and the second threshold, the shutdown temperature is higher than the hibernation temperature, and the hibernation temperature is higher than the underclocking temperature. In the normal mode and the low noise mode, the processing unit 11 compares the operating temperature thereof with the underclocking temperature, hibernation temperature and shutdown temperature, respectively. After determining that the operating temperature reaches the underclocking temperature, the processing unit 11 starts the underclocking mechanism. For instance, the processing unit 11 decreases the operating frequency thereof from 2.5 GHz to 1.6 GHz as soon as the operating temperature thereof reaches the underclocking temperature. After determining that the operating temperature exceeds the underclocking temperature and reaches the hibernation temperature, the processing unit 11 starts the hibernation mechanism and thus hibernates to therefore prevent the processing unit 11 from overheating which might otherwise cause damage to the computer system 1. After determining that the operating temperature exceeds the underclocking temperature and hibernation temperature and reaches the shutdown temperature, the processing unit 11 starts the shutdown mechanism and thus controls the computer system 1 to shut down to therefore prevent the processing unit 11 from overheating which might otherwise cause damage to the computer system 1.

The underclocking temperature included in the second threshold is lower than the underclocking temperature included in the first threshold. The hibernation temperature included in the second threshold is lower than the hibernation temperature included in the first threshold. The shutdown temperature included in the second threshold is lower than the shutdown temperature included in the first threshold. Hence, unlike the normal mode, the low noise mode enables the processing unit 11 to start the overheat protection mechanism earlier such that the processing unit 11 starts the underclocking mechanism before the operating temperature reaches the underclocking temperature included in the first threshold, starts the hibernation mechanism before the operating temperature reaches the hibernation temperature included in the first threshold, or starts the shutdown mechanism before the operating temperature reaches the shutdown temperature included in the first threshold. Therefore, internal temperature of the computer system 1 is under control in the low noise mode.

In an embodiment, the underclocking temperature, hibernation temperature and shutdown temperature in the first threshold are 96° C., 98° C. and 99° C., respectively, whereas the underclocking temperature, hibernation temperature and shutdown temperature in the second threshold are 90° C., 94° C. and 96° C., respectively. Hence, in the normal mode, the processing unit 11 will underclock, hibernate, and order the computer system 1 to shut down, if the operating temperature of the processing unit 11 reaches 96° C., 98° C. and 99° C., respectively. In the low noise mode, the processing unit 11 will underclock, hibernate, and order the computer system 1 to shut down, if the operating temperature of the processing unit 11 reaches 90° C., 94° C. and 96° C., respectively.

In an embodiment, the computer system 1 shuts down in multiple stages. Given one of the first threshold and the second threshold, the shutdown temperature comprises a first temperature and a second temperature. The first temperature is lower than the second temperature. In the normal mode and the low noise mode, the processing unit 11 compares the operating temperature thereof with the first temperature and compares the operating temperature thereof with the second temperature. After determining that the operating temperature thereof reaches the first temperature but does not reach the second temperature, the processing unit 11 terminates a program being executed and then controls the computer system 1 to shut down. After determining that the operating temperature thereof exceeds the first temperature and reaches the second temperature, the processing unit 11 controls the computer system 1 to shut down compulsorily without waiting for the shutdown of the program, so as to preclude an overly high operating temperature which might otherwise cause the computer system 1 to hang or get damaged.

The first temperature included in the shutdown temperature of the second threshold is lower than the first temperature included in the shutdown temperature of the first threshold. The second temperature included in the shutdown temperature of the second threshold is lower than the second temperature included in the shutdown temperature of the first threshold. Hence, unlike the normal mode, the low noise mode not only enables the processing unit 11 to start a multiple-stage shutdown mechanism earlier, but also enables internal temperature of the computer system 1 to be under control. In an embodiment, the first and second temperatures included in the shutdown temperature of the second threshold are 96° C. and 98° C., respectively, whereas the first and second temperatures included in the shutdown temperature of the first threshold are 99° C. and 100° C., respectively.

In an embodiment, the processing unit 11 and the temperature detecting unit 12 are implemented by a central processing unit (CPU); hence, the processing unit 11 and the temperature detecting unit 12 are a control-oriented chip and a temperature detection-oriented chip in the CPU, respectively. Alternatively, in another embodiment, the processing unit 11 and the temperature detecting unit 12 are implemented by the CPU and a temperature detection-oriented standalone chip, respectively. The fan control unit 14 is an embedded controller (EC).

Referring to FIG. 1, in an embodiment, the computer system 1 further comprises a power management unit 15 and a graphics processing unit 16. The power management unit 15 is controlled by the processing unit 11. The power management unit 15 limits the maximum operating frequency of the graphics processing unit 16. In the low noise mode, the processing unit 11 generates another control signal S2 and drives the power management unit 15 to limit the maximum operating frequency of the graphics processing unit 16 so as to prevent the graphics processing unit 16 from generating much heat (which is likely to cause the computer system 1 to hang or get damaged) while operating at a high operating frequency. In an embodiment, the graphics processing unit 16 is a display card.

As shown in FIG. 1, the computer system 1 further comprises another fan unit 17 controlled by the fan control unit 14. The fan unit 17 assists the graphics processing unit 16 in dissipating heat and thereby decreases the operating temperature of the graphics processing unit 16. In the low noise mode, the processing unit 11 controls the fan control unit 14 to shut down the fan unit 17 such that the rotational speed of the fan unit 17 becomes zero, thereby reducing noise from the fan unit 17.

In conclusion, a computer system and method for reducing noise from a cooling fan according to the present invention feature a low noise mode in which a fan unit is shut down to not only reduce noise therefrom and thus silence the computer system in operation, but also reduce power consumed by the fan unit in operation and thus increase the computer system's operable duration or standby duration, thereby extending its battery life.

Although the present invention is disclosed above by preferred embodiments, the preferred embodiments are not restrictive of the present invention. Changes and modifications made by persons skilled in the art to the preferred embodiments without departing from the spirit and scope of the present invention must be deemed falling within the scope of the present invention. Accordingly, the legal protection for the present invention should be defined by the appended claims.

What is claimed is:

1. A computer system for reducing noise from a cooling fan, comprising:
    a processing unit configured to set an operating mode of the computer system to one of a normal mode and a low noise mode according to a selection signal, wherein the processing unit has an operating temperature;
    a temperature detecting unit configured to measure the operating temperature;
    a first fan unit arranged to dissipate of heat from the processing unit;
    a fan control unit coupled to the first fan unit and the processing unit and controlled by the processing unit;
    a graphics processing unit and a power management unit, the power management unit coupled to the graphics processing unit and the processing unit and controlled by the processing unit, wherein the power management unit limits a maximum operating frequency of the graphics processing unit in the low noise mode; and
    a second fan unit coupled to the fan control unit and arranged to dissipate heat from the graphics processing unit;
    wherein the processing unit is configured to control the fan control unit to adjust a rotational speed of the first fan unit according to the operating temperature and to control the second fan unit to dissipate heat from the graphics processing unit in response to the computer system being in the normal mode, and to shut down the first fan unit in response to the computer system being in the low noise mode, and
    wherein the processing unit is further configured to start an underclocking mechanism in response to the operating temperature reaching a first underclocking threshold temperature while the computer system is in the normal mode, and to start the underclocking mechanism in response to the operating temperature reaching a second underclocking threshold temperature while the computer system is in the low noise mode, the second underclocking threshold temperature being lower than the first underclocking threshold temperature,
    wherein the processing unit is further configured to control the fan control unit to shut down the second fan unit in response to the computer being in the low noise mode, and
    wherein the underclocking mechanism comprises causing the processing unit to underclock.

2. The computer system of claim 1, wherein the processing unit is further configured to start a hibernation mechanism in response to the operating temperature reaching a first hibernation threshold temperature higher than the first underclocking threshold temperature while the computer system is in the normal mode, and to start the hibernation mechanism in response to the operating temperature reaching a second hibernation threshold temperature higher than the second underclocking threshold temperature while the computer system is in the low noise mode, the second hibernation threshold temperature being lower than the first hibernation threshold temperature, and
    wherein the hibernation mechanism comprises causing the computer system to hibernate.

3. The computer system of claim 2, wherein the processing unit is further configured to start a shutdown mechanism in response to the operating temperature reaching a first shutdown threshold temperature higher than the first hibernation threshold temperature while the computer system is in the normal mode, and to start the shutdown mechanism in response to the operating temperature reaching a second shutdown threshold temperature higher than the second hibernation threshold temperature while the computer system is in the low noise mode, the second shutdown threshold temperature being lower than the first shutdown threshold temperature, and
    wherein the shutdown mechanism comprises causing the computer system to shutdown.

4. The computer system of claim 2, wherein the processing unit is further configured to start a multistage shutdown mechanism while the computer system is in the normal mode, and to start the multistage shutdown mechanism while the computer system is in the low noise mode,
    wherein the multistage shutdown mechanism comprises terminating at least one program being executed in response to the operating temperature reaching a first multistage shutdown threshold temperature higher than the first hibernation threshold temperature while the computer system is in the normal mode, and causing the causing the computer system to shut down in response the operating temperature reaching a second multistage shutdown threshold temperature higher than the first multistage shutdown threshold temperature while the computer system is in the normal mode,
    wherein the multistage shutdown mechanism further comprises terminating the at least one program being executed in response to the operating temperature reaching a third multistage shutdown threshold temperature higher than the second hibernation threshold temperature while the computer system is in the low noise mode, and causing the causing the computer system to shut down in response to the operating temperature reaching a fourth multistage shutdown threshold temperature higher than the third multistage shutdown threshold temperature while the computer system is in the low noise mode, and
    wherein the third multistage shutdown threshold temperature is lower than the first multistage shutdown threshold temperature, and the fourth multistage shutdown threshold temperature is lower than the second multistage shutdown threshold temperature.

5. A method for reducing noise from a cooling fan, the method being applicable to a computer system comprising a processing unit, a graphics processing unit and a power management unit, the power management unit coupled to the graphics processing unit and the processing unit and controlled by the processing unit, the method comprising the steps of:
- setting an operating mode of the computer system to one of a normal mode and a low noise mode by the processing unit according to a selection signal;
- measuring an operating temperature of the processing unit;
- in response to the computer system being set in the normal mode:
  - controlling a rotational speed of a first fan unit to dissipate heat from the processing unit according to the operating temperature by a fan control unit;
  - dissipating heat from the graphics processing unit by a second fan unit; and
  - starting an underclocking mechanism in response to the operating temperature reaching a first underclocking threshold temperature; and
- in response to the computer system being set in the low noise mode:
  - limiting a maximum operating frequency of the graphics processing unit by the power management unit;
  - shutting down the first fan unit and the second fan unit by the fan control unit; and
  - starting the underclocking mechanism in response to the operating temperature reaching a second underclocking threshold temperature, wherein the second threshold is lower than the first threshold,
  - wherein the underclocking mechanism comprises causing the processing unit to underclock.

6. The method of claim 5, further comprising the steps of:
- in response to the operating temperature reaching a first hibernation threshold temperature higher than the first underclocking threshold temperature while the computer system is in the normal mode, starting start a hibernation mechanism; and
- in response to the operating temperature reaching a second hibernation threshold temperature higher than the second underclocking threshold temperature while the computer system is in the low noise mode, starting the hibernation mechanism, wherein the second hibernation threshold temperature is lower than the first hibernation threshold temperature;
- wherein the hibernation mechanism comprises causing the computer system to hibernate.

7. The method of claim 6, further comprising the steps of:
- in response to the operating temperature reaching a first shutdown threshold temperature higher than the first hibernation threshold temperature while the computer system is in the normal mode, starting a shutdown mechanism; and
- in response to the operating temperature reaching a second shutdown threshold temperature higher than the second hibernation threshold temperature while the computer system is in the low noise mode, starting the shutdown mechanism, wherein the second shutdown threshold temperature is lower than the first shutdown threshold temperature;
- wherein the shutdown mechanism comprises causing the computer system to shutdown.

8. The method of claim 6, further comprising the steps of:
- starting a multistage shutdown mechanism while the computer system is in the normal mode, and starting the multistage shutdown mechanism while the computer system is in the low noise mode;
- wherein the multistage shutdown mechanism comprises the steps of terminating at least one program being executed in response to the operating temperature reaching a first multistage shutdown threshold temperature higher than the first hibernation threshold temperature while the computer system is in the normal mode, and causing the causing the computer system to shut down in response the operating temperature reaching a second multistage shutdown threshold temperature higher than the first multistage shutdown threshold temperature while the computer system is in the normal mode; and
- wherein the multistage shutdown mechanism further comprises the steps of terminating the at least one program being executed in response to the operating temperature reaching a third multistage shutdown threshold temperature higher than the second hibernation threshold temperature while the computer system is in the low noise mode, and causing the causing the computer system to shut down in response to the operating temperature reaching a fourth multistage shutdown threshold temperature higher than the third multistage shutdown threshold temperature while the computer system is in the low noise mode;
- wherein the third multistage shutdown threshold temperature is lower than the first multistage shutdown threshold temperature, and the fourth multistage shutdown threshold temperature is lower than the second multistage shutdown threshold temperature.

* * * * *